US005893914A

United States Patent [19]
Clapp

[11] Patent Number: 5,893,914
[45] Date of Patent: Apr. 13, 1999

[54] INTERACTIVE COMPUTERIZED DOCUMENT ASSEMBLY SYSTEM AND METHOD

[76] Inventor: Barbara Clapp, 4 Flintlock Dr., Acton, Mass. 01720

[21] Appl. No.: 08/828,827

[22] Filed: Mar. 17, 1997

Related U.S. Application Data

[63] Continuation of application No. 08/396,881, Mar. 1, 1995, abandoned, which is a continuation of application No. 08/089,638, Jul. 12, 1993, abandoned, which is a continuation of application No. 07/625,881, Dec. 11, 1990, abandoned.

[51] Int. Cl.$^6$ .................................................. G06F 17/21
[52] U.S. Cl. .......................... 707/507; 707/513; 707/539
[58] Field of Search ............................. 707/500, 505, 707/506, 507, 508, 511, 513, 517, 522, 526, 529, 530, 531, 539, 540, 900, 901, 908

[56] References Cited

U.S. PATENT DOCUMENTS

| 4,809,220 | 2/1989 | Carlson et al. ................. 364/419 |
|---|---|---|
| 4,858,171 | 8/1989 | Furusawa et al. .............. 364/419 |
| 5,006,998 | 4/1991 | Yasunobu et al. ............. 364/408 |
| 5,025,396 | 6/1991 | Parks et al. ................... 364/518 |
| 5,043,891 | 8/1991 | Goldstein et al. ............. 364/419 |
| 5,140,650 | 8/1992 | Casey et al. .................. 382/61 |
| 5,148,366 | 9/1992 | Buchanan et al. ............ 364/419 |
| 5,313,394 | 5/1994 | Clapp ......................... 364/419.1 |

OTHER PUBLICATIONS

"ABF: A system for automating document compilation" by James Sprowl et al. pp. 1987. AFIPS Press.
AFIPS Press "a system for automating document compilation" Publ. date 1987 pp. 711-717, Sprowl et al.
Cini., Journal: Macworld vol. v3 "Document construction set", Publ. date 1986.

*Primary Examiner*—Stephen R. Tkacs
*Attorney, Agent, or Firm*—Wolf, Greenfield & Sacks, PC

[57] ABSTRACT

An interactive computerized document assembly system includes a model template formed of a sequence of sections and having decisional options including clause repeats and conditional clauses and questions to be answered for a document to be assembled; as well as functions for indicating the location in the model template for the decisional options to identify the sequence of sections constituting the model template; a video display for displaying a portion of the template; an answer index for storing answers to questions posed in the portion of the template displayed, each of the questions having a unique identifier; merging with each displayed section or part thereof the answers corresponding to each displayed section or part thereof; and combining and redisplaying in sequence each displayed merged section or part thereof in order to assemble a document from the model template.

22 Claims, 19 Drawing Sheets

```
112    42                           ,110
 \     /
  \   /       SPECIAL POWER OF ATTORNEY
   \ /
  [[Party's or Parties' Name(s) A1.1]], residing at [Street Address
A1.3], [City A1.4], [County A1.5] County, [State A1.6], do hereby appoint
[Attorney's Name A2.1] of [Street Address A2.2], [City A2.3], [County
A2.4] County, [State A2.5], [my/our IA1.2,3] attorney in fact to:

{The following text is repeated for each piece of real estate being
affected by the power of attorney. [Address K3,#]}

To grant, bargain, sell, and convey [my/our IA1.2,3] real property
located at [Address K3,#], under the terms [with/without the taking back
of a purchase money mortgage/deed of trust/specify type of mortgage or
deed 5], and to collect and receive the proceeds from any such
transaction.

{The following text will be included if this power of attorney is granted
for a specific period of time. [Yes A3-a]}

This power of attorney shall become effective on [Effective date
A4], and shall terminate on [Expiration date A5].

——Powers of Attorney————————ALL—
```

Template 40

SPECIAL POWER OF ATTORNEY

[Party's or Parties' Name(s) A1.1], [County A1.4], [City A1.5] County, [State A1.6], residing at [Street Address A1.3], [City A1.4] of [Street Address A2.2], [City A2.3], [County A2.4] County, [State Name A2.1], [my/our 1A1.2,3] attorney in fact to: A2.5], do hereby appoint [Attorney's {The following text is repeated for each piece of real estate being affected by the power of attorney. [Address K3,#]}

→ To grant, bargain, sell, and convey [my/our 1A1.2,3] real property located at [Address K3,#], under the terms [with/without the taking back of a purchase money mortgage/deed of trust/specify type of mortgage or deed 5], and to collect and receive the proceeds from any such transaction.

{The following text will be included if this power of attorney is granted for a specific period of time. [Yes A3-a]}

This power of attorney shall become effective on [Effective date A4], and shall terminate on [Expiration date A5].

Executed this _____ day of _____,
_____, at _____, [state A1.6].

_____
[Party's or Parties' Name(s) A1.1]

State of [State A1.6]
County of [County A1.5]

*FIG. 3*

SPECIAL POWER OF ATTORNEY

[Party's or Parties' Name(s) A1.1], residing at [Street Address A1.3], [City A1.4], [County A1.5] County, [State A1.6], do hereby appoint [Attorney's Name A2.1] of [Street Address A2.2], [City A2.3], [County A2.4] County, [State A2.5], [my/our 1A1.2,3] attorney in fact to:

{The following text is repeated for each piece of real estate being affected by the power of attorney. [Address K3,#]}

To grant, bargain, sell, and convey [my/our 1A1.2,3] real property located at [Address K3,#], under the terms [with/without the taking back of a purchase money mortgage/deed of trust/specify type of mortgage or deed 5], and to collect and receive the proceeds from any such transaction.

{The following text will be included if this power of attorney is granted for a specific period of time. [Yes A3=a]}

This power of attorney shall become effective on [Effective date A4], and shall terminate on [Expiration date A5].

Powers of Attorney————ALL

FIG. 6

```
         [Party's or Parties' Name(s) A1.1], residing at [Street Address
A1.3], [City A1.4], [County A1.5] County, [State A1.6], do hereby appoint
[Attorney's Name A2.1] of [Street Address A2.2], [City A2.3], [County
A2.4] County, [State A2.5], [my/our IA1.2,3] attorney in fact to:

{The fol  Enter the name(s) of the party's or parties' who will
affected  be executing this power of attorney, whether it is a
          single person or a married couple and the complete
located   address.
of a pur
deed 5],     A1.1 Name(s):  | John and Mary Smith
transact
             IA1.2 Name(s) belong to a:   b - Married couple   M
{The fol
for a sp     A1.3 Street Address:
             | 123 First Street
A4], and
             A1.4 City:                   | Boston Ok - next         Ok - close          Cancel ═══════ Powers of Attorney ═══════
```

FIG. 7

*John and Mary Smith*, residing at *123 First Street*, *Boston*, *Suffolk* County, *Massachusetts*, do hereby appoint [Attorney's Name A2.1] of [Street Address A2.2], [City A2.3], [County A2.4] County, [State A2.5], *our* attorney in fact to:

{The following person who
affected  Enter the name and complete address of the person who
          will be given the Power of Attorney.

[Address
purchase   A2.1 Attorney's Name: | Robert Blanding
and to c
           A2.2 Street Address: | 456 Second Street {The fol   A2.3 City:            | Bedford
for a sp
           A2.4 County:          | Middlesex
A4], and
           A2.5 State:           | Massachusetts Ok - next    Ok - close    Cancel Powers of Attorney

FIG. 8

{The following text is repeated for each piece of real estate being affected by the power of attorney. [Address K3,#]}

To grant, bargain, sell, and convey *our* real property located at [Address K3,#], under the terms [with/without the taking back of a purchase deed 5], and to c K3,# - Specify the address of each real property that will be affected by this power of attorney.

{The fol for a sp

| Address | |
|---|---|
| K3,1 | 1 Main Street, Rockport, Massachusetts |
| K3,2 | 2 South Street, Natick, Massachusetts |

A4], and

Ok - next    Ok - close    Cancel

Powers of Attorney                        ALL

FIG. 9

```
To grant, bargain, sell, and convey *our* real property located at
<1 Main Street, Rockport, Massachusetts>, under the terms [with/without
the taking back of a purchase money mortgage/deed of trust/specify type of
mortgage or deed 5], and to collect and receive the proceeds from any such
transaction.

<2 South...                  cated at
taking b      5 - The attorney will have the power to affect the   hout the
mortgage      ownership rights of the real estate at 1 Main Street,  e of
transact     Rockport, Massa.... Describe the type of mortgage or  any such
             deed of trust used in any such sale.
[The fol
for a sp          —Select one - current value: a————————granted
A4], and                                                          120
              a - with the taking back of a purchase money
                  mortgage                                      e date
              b - without the taking back of a purchase money
                  mortgage
              c - deed of trust
              d - other (specify type of mortgage or deed)

Ok - next        Ok - close      Cancel
                                                                    ALL
                            Powers of Attorney
```

*FIG. 10*

50 → To grant, bargain, sell, and convey *our* real property located at <1 Main Street, Rockport, Massachusetts>, under the terms *with the taking back of a purchase money mortgage*, and to collect and receive the proceeds from any such transaction.

50a → To grant, bargain, sell, and convey *our* real property located at <2 South Street, Natick, Massachusetts>, under the terms [with/without the taking back of a purchase money mortgage/deed of trust/specify type of mortgage or deed 5], and to collect and receive the proceeds from any such transaction.

{The following text will be included if this power of attorney is granted for a specific period of time. [Yes A3-a]}

This power of attorney shall become effective on [Effective date A4], and shall terminate on [Expiration date A5].

Executed this _____ day of _____, at _____, *Massachusetts*.

_____ ALL
*John and Mary Smith*.

Powers of Attorney

FIG. 11

To grant, bargain, sell, and convey *our* real property located at <2 South Street, Natick, Massachusetts>, under the terms [with/without the taking back of a purchase money mortgage/deed of trust/specify type of mortgage or deed 5], and to collect and receive the proceeds from any such transaction.

[The fol  5 - The attorney will have the power to affect the
for a sp    ownership rights of the real estate at 2 South Street,
            Natick, Massac.... Describe the type of mortgage or
A4], and    deed of trust used in any such sale.

```
      Select one - current value: c
 a - with the taking back of a purchase money
     mortgage
 b - without the taking back of a purchase money
     mortgage
 c - deed of trust
 d - other (specify type of mortgage or deed)

Ok - next         Ok - close          Cancel
```

Powers of Attorney

FIG. 12

{The following text will be included ▶if this power of attorney is granted for a specific period of time. [Yes A3-a]}

This power of attorney shall become effective on [Effective date A4], and shall terminate on [Expiration date A5].

A3 - Will this power of attorney be granted for a specific period of time?

Select one - current value: a a - Yes
b - No ok - next    ok - close    Cancel

Powers of Attorney                    ALL

FIG. 13

ALL

64 → [Effective date]

This power of attorney shall become effective on [Effective date], and shall terminate on [Expiration date A5].

110

Executed this _____ day of _____,

This power of attorney will be granted for a specific period of time. Enter the date when this power of attorney will become effective.

A4 Effective date: [January 1, 1991

Ok - next        Ok - close        Cancel

120

64 → [A4]

Powers of Attorney

FIG. 14

This power of attorney shall become effective on *January 1, 1991*, and shall terminate on [Expiration date A5].

Executed this _____ day of _____,

This power of attorney will be granted for a specific period of time. Enter the date when this power of attorney will expire.

A5 Expiration date:     December 31, 1999

Ok - next       Ok - close       Cancel

Powers of Attorney                                    ALL

FIG. 15

SPECIAL POWER OF ATTORNEY

*John and Mary Smith*, residing at *123 First Street*, *Boston*, *Suffolk* County, *Massachusetts*, do hereby appoint *Robert Blanding* of *456 Second Street*, *Bedford*, *Middlesex* County, *Massachusetts*, *our* attorney in fact to:

To grant, bargain, sell, and convey *our* real property located at <1 Main Street, Rockport, Massachusetts>, under the terms *with the taking back of a purchase money mortgage*, and to collect and receive the proceeds from any such transaction.

To grant, bargain, sell, and convey *our* real property located at <2 South Street, Natick, Massachusetts>, under the terms *deed of trust*, and to collect and receive the proceeds from any such transaction.

This power of attorney shall become effective on *January 1, 1999*, and shall terminate on *December 31, 1999*.

Executed this _____ day of _____ _____,

_____, at _____, *Massachusetts*.

_____
*John and Mary Smith*

FIG. 16

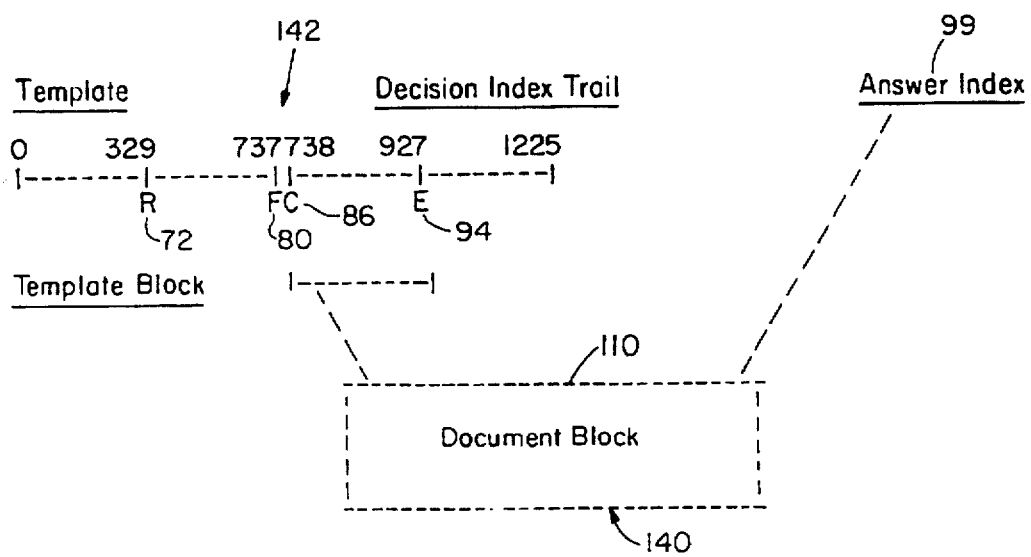
FIG. 17
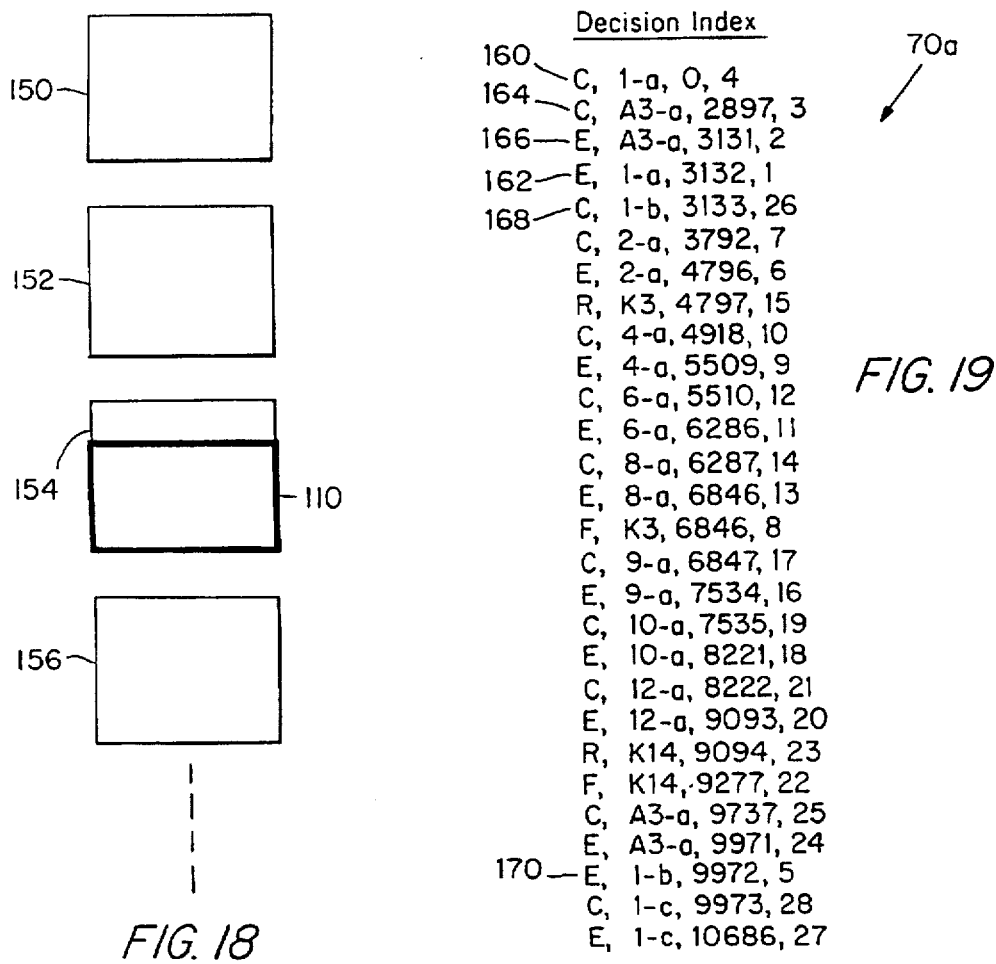
FIG. 18
FIG. 19

INTERACTIVE COMPUTERIZED DOCUMENT ASSEMBLY SYSTEM AND METHOD

This application is a continuation of application Ser. No. 08/396,881, filed Mar. 1, 1995 now abandoned, which is a continuation, of application Ser. No. 08/089,638, filed Jul. 12, 1993, now abandoned, which is a continuation of application Ser. No. 07/625,881, filed Dec. 11, 1990 now abandoned.

FIELD OF INVENTION

This invention relates to an interactive computerized document assembly system, and more particularly to such a system which creates or re-creates the document each time and only when the document is called.

BACKGROUND OF INVENTION

Conventional document assembly systems such as used by lawyers to compose legal documents begin by asking a series of questions pertinent to the construction of the final document. The answers to these questions are then merged into the basic document or template to fill in designated blanks. These answers are also used to determine what clauses should be eliminated, added or repeated In these systems the answers are not directly inserted into the pre-written text or template. Rather, the answers are stored as responses to the questions. When a merge command is given then the answers are added to the template, after which the complete text—template with answers—can be called up and viewed. If at this point the user is dissatisfied with the answer as it appears inserted in the text, the question and answer mode must be accessed once again. Then the specific question whose answer is not satisfactory is called up again. A new answer is supplied and then once again the system must be switched to the merge mode, after which a complete form of the text with the new answer can be viewed. Separation of the answering function and the merge and display functions makes the system unable to present the answers in their textual context while the question and answer cycle is operating. This is an especially troublesome feature when the system is being used to draft complicated documents such as legal instruments.

Further, these systems require that the location of the question blanks in the text be mapped so that their position can be ascertained in spite of shifts in location due to variations in the lengths of answers and/or the inclusion, omission or repetition of optional decisional clauses. This mapping feature requires substantial computing power and memory size, and tends to make the system cumbersome and slow in addition to compelling a separation of the answer and the merge modes.

SUMMARY OF INVENTION

It is therefore an object of this invention to provide an improved document assembly system which affords truly interactive document creation.

It is a further object of this invention to provide such an improved document assembly system which is faster, simpler and smaller.

It is a further object of this invention to provide such an improved document assembly system in which the text can be viewed as the answers are inserted in the question and answer mode without the necessity to merge and further display.

It is a further object of this invention to provide such an improved document assembly system in which the answers can be easily changed at any time, whether entering or editing.

It is a further object of this invention to provide such an improved document assembly system which can at any point in the document create or recreate the document from the template and answers.

It is a further object of this invention to provide such an improved document assembly system which eliminates the need for mapping locations of all the question blanks in the text.

The invention results from the realization that a simple yet extremely high-performance document assembly system utilizing a full text model template can be achieved by employing a decisional index to indicate the location of decisional options such a clause repeats and conditional clauses, and using the locations of those decisional options to identify the sections of the model template to be merged with previously stored answers and combined in sequence to contemporaneously recreate the document each time a new answer is supplied.

This invention features an interactive computerized document assembly system including means for storing a model template, formed from a sequence of sections and having decisional options including clause repeats and conditional clauses and questions to be answered, for a document to be assembled. There are means for indicating the location in the model template of the decisional options to identify the sequence of sections constituting the model template. There are also means for displaying a portion of the template and means for storing answers to questions posed in the portion of the template displayed. Each such question has a unique identifier. There are means for merging with each displayed section or part thereof the answers corresponding to each displayed section or part thereof, and means for combining and redisplaying in sequence each displayed merged section or part thereof in order to assemble a document from the model template.

In a preferred embodiment, the means for determining the location of the decisional options includes means for representing the text offset of the beginning and end of each decisional option in the model template. The means for displaying may include a video display device. The means for storing answers may include an answer index having a unique identifier for each answer corresponding to its associated question. The means for merging may include means for matching the identifier of each question with the corresponding answer identifier. The means for combining and redisplaying may include means for detecting the location of the start of the next decision option in the template; means for tracking the present position in the template; and means, responsive to the present position being ahead of the start of the next decision option, for assembling into the document the template section up to the start of the next decision option. The means for combining and redisplaying may also include means responsive to the present position being at or in a decision option for determining whether the decision option is to be assembled into the document or skipped. The means for combining and redisplaying may further include means responsive to the present position being at or past the end of a clause repeat, for deciding whether the clause represented by the clause repeat decisional option is to be repeated in the document. The system may further include means responsive to the means for storing answers for deleting portions of the document previously assembled and displayed upon entry of an answer into a displayed section.

The invention may also feature a document assembly system including means for storing a model template, formed of a sequence of sections and having decisional options including clause repeats and conditional clauses and questions to be answered, for a document to be assembled. There are means for indicating the location in the model template of the decisional options to identify the sequence of sections constituting the model template; and means for storing answers to questions posed in the template. Finally there are means for merging with each section or part thereof the answers corresponding to each preselected section and for outputting each preselected section with the answers to assemble the document.

BRIEF DESCRIPTION OF THE DRAWINGS

Other objects, features and advantages will occur to those skilled in the art from the following description of a preferred embodiment and the accompanying drawings, in which:

FIG. 3 is a replica of the template of the document chosen to be assembled;

FIG. 6 is an illustration of the screen displaying a portion of the template of FIG. 3 used to create a portion or a block of the final document with the first question to be answered highlighted;

FIG. 7 is an illustration similar to FIG. 6 with the template scrolled upwardly so that the title is no longer a part of the document block on the screen and showing the question box opened for the first question;

FIG. 8 is a view similar to FIG. 7 with the answers inserted in the question box of FIG. 7 already installed at the proper position in the text with the second question blank highlighted and the question box open for answering the second question blank;

FIG. 9 is a view similar to FIG. 8 with the template scrolled upward yet again to form a new document block from the template with the next question highlighted and the question box set to receive answers to that question blank;

FIG. 10 is an illustration of the screen similar to FIG. 9 with the template further scrolled showing the answer supplied in FIG. 9 already inserted into the text, the next question blank highlighted and the question box set to receive answers to that question;

FIG. 11 is a view similar to FIG. 10 with the question box closed, showing the screen with the last previously answered question highlighted;

FIG. 12 is a view similar to FIG. 11 with the question box reopened with the next question blank highlighted;

FIG. 13 is an illustration similar to FIG. 12 with the template further scrolled up the screen to show a different document block with the next question highlighted and the question box open to receive answers to that question, which is a conditional question;

FIG. 14 shows the options presented in the next question blank as a result of the conditional clause selected in FIG. 13;

FIG. 15 is a view similar to FIG. 14 showing a second question blank in a conditional clause which must be answered as a result of the selection of this condition in FIG. 13;

FIG. 16 shows the completed assembled document on the screen;

FIG. 17 is a schematic diagram illustrating the manner in which the decision index is used in conjunction with the answer index for creating or recreating a document block called to the screen;

FIG. 18 is a schematic illustration of the operation of the system with an enlarged template which includes a number of document blocks far in excess of a single screen;

FIG. 19 is a more extensive decision index similar to FIG. 4 for a more complicated document;

DISCLOSURE OF PREFERRED EMBODIMENT

Figure 1:
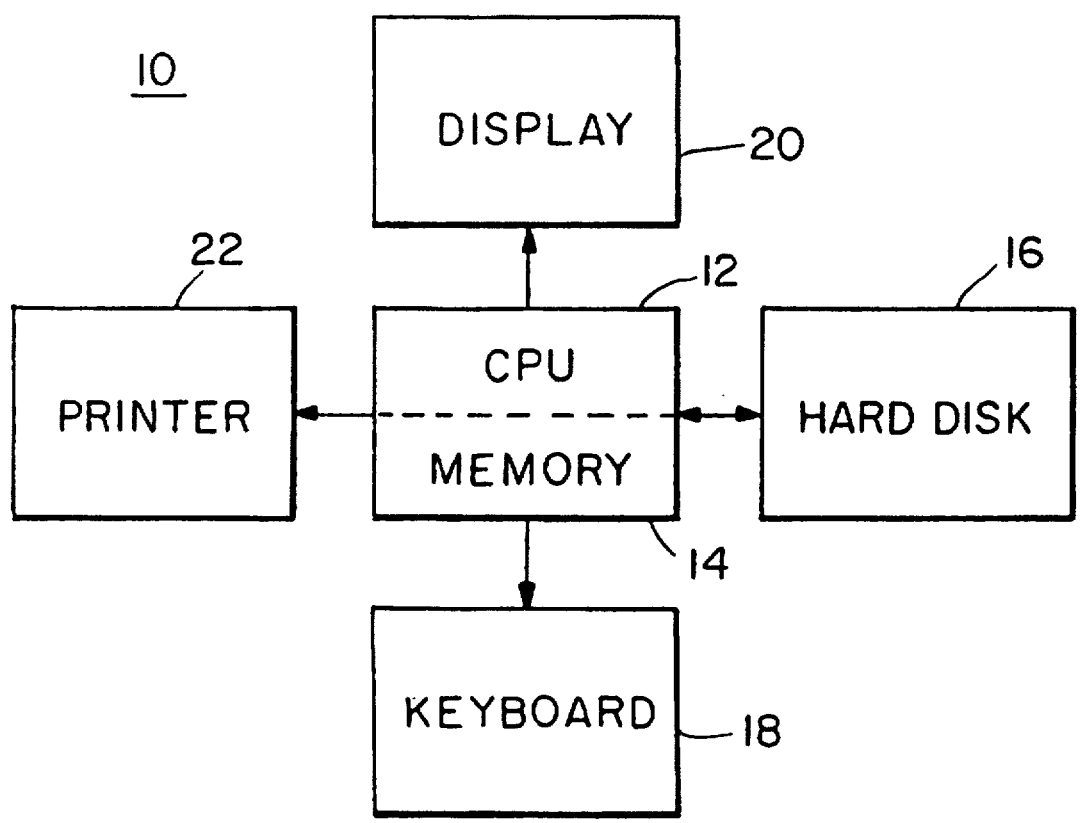
FIG. 1 is a block diagram of a computer system that can be used to accomplish this invention.

There is shown in FIG. 1 a computer system 10 which includes a CPU 12 with memory 14. There is a conventional hard disk 16, a keyboard 18 for controlling the CPU, a display 20, and a printer 22. Computer system 10 may be implemented by a conventional PC type computer such as an IBM Personal Computer AT.

Figure 2:
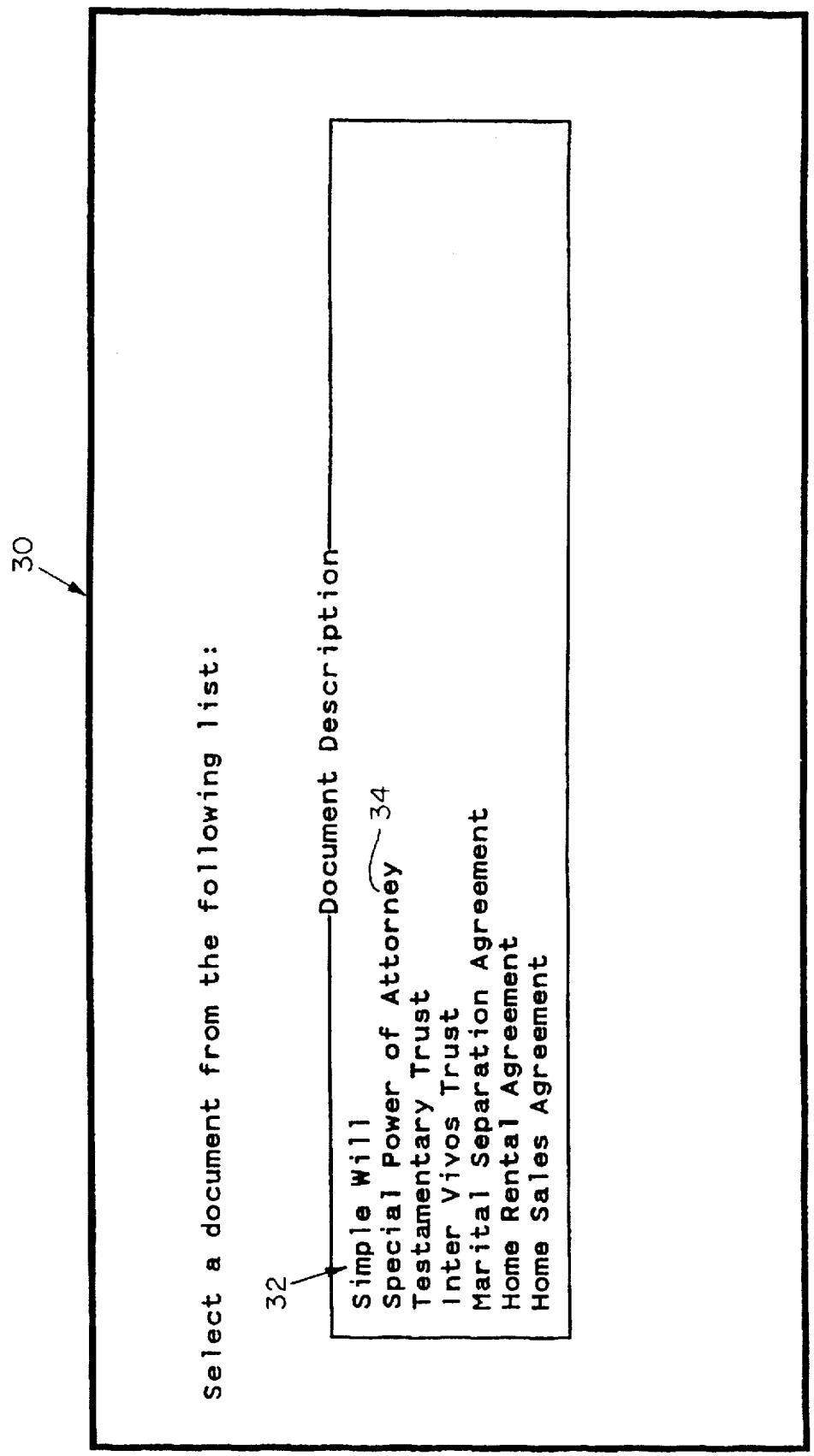
FIG. 2 is an illustration of an initial screen from which a user can choose a document to be assembled.

When the document assembly system of this invention is operating, an initial screen appearing on display 20 is menu 30, FIG. 2. The list of documents which can be assembled using this system are tabulated at 32 under the heading "Document Description". Assuming that Special Power of Attorney 34 is the chosen document, the system calls up the full template 40, FIG. 3, for the Special Power of Attorney and places it in memory 14. Template 40 includes a number of question blanks. Each question blank, indicated by the square brackets, may have one or more parts. For example, the first question blank 42 relates to the name and address of the parties. It is designated question blank A1 and includes five identifiers A1.1–A1.6. A1.2 is missing because it is an internally generated question, as will be seen subsequently. The second question blank 44, A2, has to do with the attorney's name and address and includes five identifiers A2.1–A2.5. The missing identifier in the first question blank, A1.2, appears following the second question blank at the third question blank 46 with the identifier IA1.2. Identifier A1.2 is a function of whether the first question blank 42 is answered in the name of a single party or plural parties. If it is a single party then question blank 46 automatically contains a "my"; if it is plural parties it automatically contains the word "our". In the second paragraph, the third question blank 48 represents a decisional option, namely a repeat clause. That is, if there is more than one piece of real estate affected by the power of attorney, then more than one address is provided at question blank 48, in which case the third paragraph 50 is repeated once for each piece of real property whose address is given in answer to question blank 48. There may be no properties as an answer to 48 in which case the paragraph is excluded. Within each repeat of paragraph 50, the next question blank 52 must be answered as to whether this conveyance is to be with or without the taking back of a purchase money mortgage, deed of trust, or whether a mortgage or deed is to be specified as indicated by identifier 5. Following this, in the fourth paragraph 54 the instruction is given that the next paragraph 56 is included if the power of attorney is granted for a specific period of time. Thus if the answer to question blank 58 is "yes" as indicated at identifier A3-a, then paragraph 56 is inserted and question blanks 60 and 62 represented by identifiers A4 and A5 must be answered to give the effective date and the expiration date of the power of attorney. Following this is the execution clause where the information concerning the location of the signing can be automatically inserted from the information already provided above at the question blank associated with identifier A1.6, A1.5, and A1.1.

Figure 4:
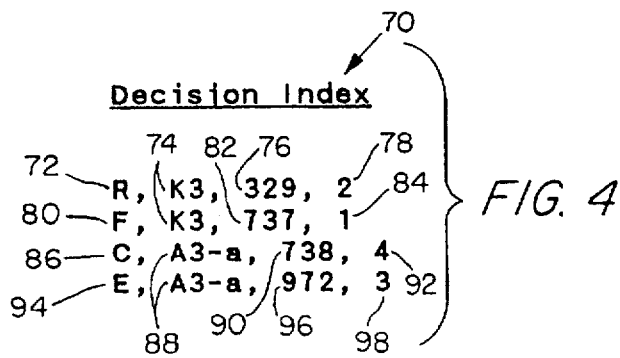
FIG. 4 is a decision index which lists the decisional options for the template of FIG. 3.

Simultaneously with the calling of the template for the Special Power of Attorney, there is called the accompanying Decision Index 70, FIG. 4, which is associated with that Special Power of Attorney 40. The Decision Index includes a list of the decisional options, that is, repeat clauses or conditional clauses, that occur in the template of the chosen document In this example, Decision Index 70 includes only two decisional options The first one is a repeat clause, the beginning of which is indicated by the letter R, 72. Its identifier, K3, is listed at 74, and its offset or location is indicated at 329 spaces from the beginning of the document as shown by the number 329 at 76. The last numeral in the statement, number 2, indicated at 78, indicates that the repeat clause ends at the second position. At the second position the letter F indicates the finish of a repeat clause. The question blank is the same, K3, and the end of the repeat clause occurs at offset or position 737 as indicated at 82. This particular clause begins at the first position as indicated by the number 1 at 84. The second and only other decisional option in Decision Index 70 is a conditional clause which begins at the letter C indicated at 86, which is associated with the identifier A3-a indicated at 88, which begins at offset 738 indicated at 90, and ends at the fourth position indicated by the number 4 at 92. The conditional clause ending indicated at the letter E designated by numeral 94 has the same identifier A3-a indicated at 88, and ends at offset 972 indicated at 96. The beginning of the conditional clause begins at position 3 as indicated by number 3 at 98. The answer index 99 includes two columns of information. On the left is the column of identifiers generally indicated at 100, which contains each of the identifiers contained in the brackets shown in template 40 in FIG. 3. The other column 102 in FIG. 5 bears the actual answers given by the user associated with each of the identifiers 100. This column is completed as the user moves through the template answering the questions posed by the template and will be complete, as shown in FIG. 5, when the entire set of questions have been answered.

In operation, the system presents a portion of the template 40 on the screen 110 of display 20 to begin preparation of a block 112 of the document to be assembled. The first portion designated by the identifier A1.1 of question blank 42, FIG. 6, is highlighted as shown, and the system is now ready to receive answers to all the questions in question blank 42, that is, those designated by the identifiers A1.1–A1.6.

At this time the system scrolls up a bit so that question blank 42 is at the top of the screen and the title, Special Power of Attorney, disappears. Also at this time the question block 120 opens on screen 110, FIG. 7. In response to the specific questions associated with identifiers A1.1, IA1.2, A1.3 and A1.4, the user types in the information John and Mary Smith, married couple, 123 First Street, and Boston, respectively. This information is immediately stored in the answer index 99 so that the first few lines of information, John and Mary Smith, We, we, our, 123 First Street, Boston, Suffolk and Massachusetts appear in column 102 and are accumulated or stored, as indicated in column 102. A1.5 (County) and A1.6 (State) do not appear because they are not presently visible on screen. In keeping with an important feature of this invention, the portion of the template on screen 110, FIG. 8, is immediately recreated with all the answers inserted and visible to the user. At this time the second question blank 44, FIG. 8, is highlighted and the question box 120 now presents the series of questions A2.1–A2.5 to identify the name and address of the attorney who will be given the power of attorney.

Figure 5:
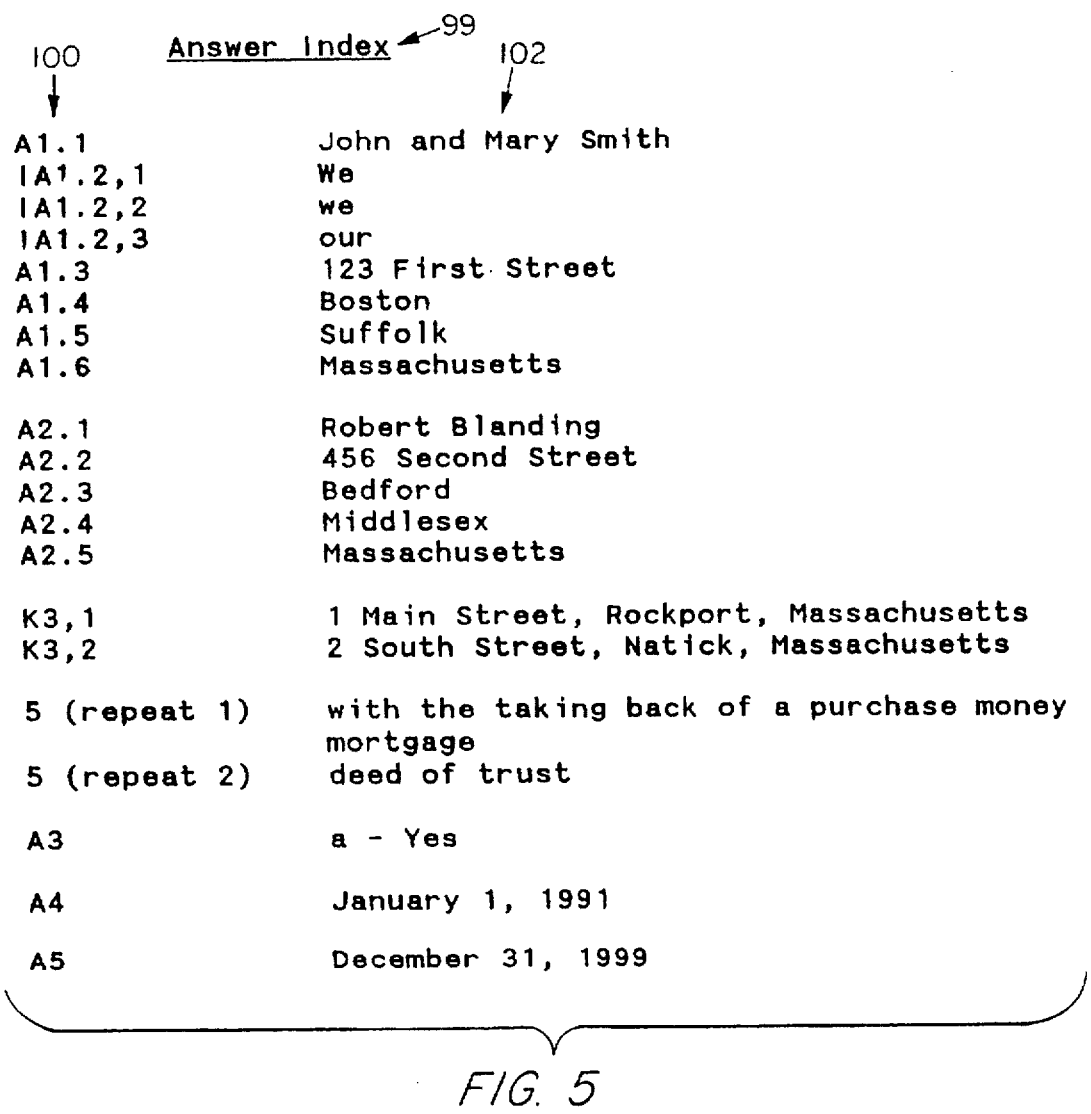
FIG. 5 is an answer index which lists the identifiers and the answers to questions posed in the template of FIG. 3.

As soon as this information is supplied in question box 120, that information is accumulated or stored in answer index 99, FIG. 5, so that column 102 now contains the information Robert Blanding, 456 Second Street, Bedford, Middlesex, Mass., opposite the identifiers A2.1–A2.5. This information, too, is immediately combined with the template and reconstructed so that the text complete with the answers is immediately displayed on screen 110 for the user. The screen is then scrolled up so that the next paragraph is at the top of the screen 110, FIG. 9. This paragraph contains the next question 48, which is a decisional option, namely a repeat clause. Decisional option question blank 48 is now highlighted, FIG. 9, and question box 120 now contains questions K3.1 and K3.2, where the addresses 1 Main Street, Rockport, Mass., and 2 South Street, Natick, Mass., have been entered indicating that there are two different pieces of property that are to be covered by this Special Power of Attorney. Immediately when these are entered they are accumulated or stored in column 102 of answer index 99, FIG. 5, opposite the identifiers K3.1, K3.2. Had there been a third and a fourth property, for example, they would be K3.3 and K3.4 with additional addresses opposite them.

Following this, FIG. 10, paragraph 50 of template 40, FIG. 3, is recreated and scrolled to the top of screen 110 with the address of the first piece of property already inserted in the proper place in the text. At this point the next question blank 52, FIG. 10, is highlighted and question box 120 is opened and set up to receive the answer to the question as to what type of terms are desired. The selection at this point is "all", which provides the answer "with the taking back of a purchase money mortgage". At this point instead of selecting "Ok - next" as is typical, the selection "Ok - close" can be made. This closes the question box 120 so that the full screen 110 can be seen as shown in FIG. 11. At this point the highlighting is still in the area of question blank 52, although that question has been answered and the answers have been already inserted in the text at the proper location. The second grant paragraph, a repeat of the first, is now also visible, designated as paragraph 50a. It contains the address of the second piece of property, namely 2 South Street, Natick, Mass. Still to be answered here is the question blank 52a which determines the terms under which the grant is to be made. Upon moving back into the question mode, FIG. 12, screen 110 once again includes question box 120 with the same question presented. This time the answer is "c", "deed of trust". Question box 120 is opened and is now highlighted as indicated at 52a, FIG. 12. The answer chosen in question box 120 at this point is "c", "deed of trust".

Paragraph 54 has now been scrolled to the top of screen 110, FIG. 13, and question blank 58 is now highlighted. Question box 120 now seeks the answer to the question as to whether this power of attorney is to be granted for a specific period of time. This is a decisional option. The answer selected in question box 120 is "a", that is, yes and it is immediately stored. Thus, following this, the next paragraph 56, a conditional paragraph, is inserted rather than skipped, and the question presented in question box 120, FIG. 14, is "What is the effective date?" This is answered in box 120, FIG. 14, with the date Jan. 1, 1991. Immediately this date is inserted in question blank 64 associated with identifier A4, as indicated in FIG. 15, and the next question blank 62 is highlighted which asks for the expiration date and is identified by the identifier A5. Thus in question box 120 the expiration date. Dec. 31, 1999, is supplied. This immediately is inserted into the question blank area 62 designated by identifier A5. At this point the Special Power of Attorney is complete and appears as shown in FIG. 16, with all of the information inserted so that the entire document 130 has now been assembled.

One of the important features of this invention is that there need not be the conventional large and complex mapping of the question blanks in order that they be properly located as their position is shifted in the template by the addition of longer or shorter answers or by the insertion, omission, or repetition of decisional options such as repeat clauses and conditional clauses. The invention accomplishes this by reconstructing the portion of the document block appearing on the screen each time an answer is changed. It also recreates the document block which is on the screen each time that any question is answered or changed in the document block appearing on the screen. This is done using the template utilizing the decision index to control the sequence of selection of the template sections that are to be joined to make the document block and simultaneously pulling in the proper answers from the answer index.

For example, for the simple Special Power of Attorney 40 displayed in FIG. 3 and used for the example in FIGS. 4–16, the document block 140, FIG. 17, on screen 110, may be constructed from the answer index 99, FIGS. 17 and 5, and the decision index 70, which is shown schematically as illustrated with respect to the decision trail index 142, FIG. 17. The system begins by determining that it is at point zero in the template and then determines where the next decisional option occurs. The next decisional option, indicated by R, 72, the beginning of a repeat clause, occurs at offset 329. Therefore the system takes the pieces of template from 0 to 328 and delivers them directly to the document block 140 on screen 110. At the same time, any portions of that section of the template which contains square brackets is scanned for its identifier. When the identifier, for example A1.1, is found, a search is made in answer index 99. If no answer is present in column 102, FIG. 5, opposite identifier A1.1, then a question blank is simply reproduced at that point. If there is an answer then the answer is reproduced. The system then finds itself at point 329 and so it reproduces the repeat clause which exists from offset 329 to offset 737. This is directed to document block 140 on screen 110 and is combined with whatever question blanks or answers are indicated by question blanks within the square brackets in that section of the template. At the end of that repeat clause, indicated by the letter F at 80, the system looks to find a second identifier, K3.2, accompanied by a second address, and so the system moves back to offset 329 and once again reproduces the repeat clause from position 329 to position 737 in the document block 140, this time supplying the different address associated with identifier K3.2. At this point the system finds itself at offset 738 facing another form of decisional option, the conditional clause, which has to do with whether or not the power of attorney is granted for a specific period of time. Since it was, the conditional clause is included and so the section of the template from offset 738 to offset 927 is delivered to document block 140 and combined with the answers from answer index 99 which are associated with identifiers A4 and A5. At this point the letter E at 94 indicates that the conditional clause is at an end, and the system once again seeks to find the next decisional option. Since there is none from 927 to the end of the template at offset 1225, the system simply copies the remaining text into document block 140 in conjunction with the suitable answers from answer index 99.

While for simplicity the Special Power of Attorney chosen as an example was short, this is not a necessary limitation of the invention. For example, a large number of document blocks 150, 152, 154, 156, FIG. 18, and so on, may be involved. In each case the screen may contain an entire block, more than a block of the template, or less than a block of the template. In any case, each time that a portion of the document having been formed from the combination of the template and the answers given is called to the screen, that called portion of the document is recreated because the document as a whole does not actually reside anywhere in the system. That is, at any given point in time the answers are all stored in answer index 99, the decisional options are all stored in Decision Index 70, and the Decision Index 70 is utilized to direct the combination of sections of the template in conjunction with the answers from answer index 99 to recreate the portion of the document being called. Whether it is called for display on the screen, or for printing, or to be saved for a particular purpose, the effect is the same. Thus for example, if the system is working on screen 110 which contains a portion of block 154, then the remainder of block 154 plus all of blocks 150, 152, 156, have been eliminated; that is, they do not exist except insofar as the information to reconstruct them exists in the decision index 70, the answer index 99, and the basic template 40.

Although the Special Power of Attorney is a simple one for purposes of illustration and the decision index 70, FIG. 4, is similarly simple for purposes of illustration, this is not a necessary limitation of the invention. For example, a more complicated document may have conditional clauses inside of repeat clauses and repeat clauses inside of conditional clauses, and may have them cascaded. For example, as can be seen in Decision Index 70a, FIG. 19, the first decisional option, condition clause 160, has its beginning indicated by C associated with a question blank 1-A and indicates that it begins at zero and that its end is at decision option 4. Thus in the fourth position down at 162, E indicates the end at offset 3132 of the conditional clause begun at 160, C. Within that conditional clause is another conditional clause which begins at C 164, at offset 2897, and ends at E 166, at offset 3131. The next decisional option begins at the conditional clause which begins at 168 C at offset 3133, and ends at position 26 at the E marked 170 at offset 9972. Within that conditional clause alone, there are numerous other conditional and repeat clauses as can be seen between the beginning 168 C and the end 170 E.

Figure 20:
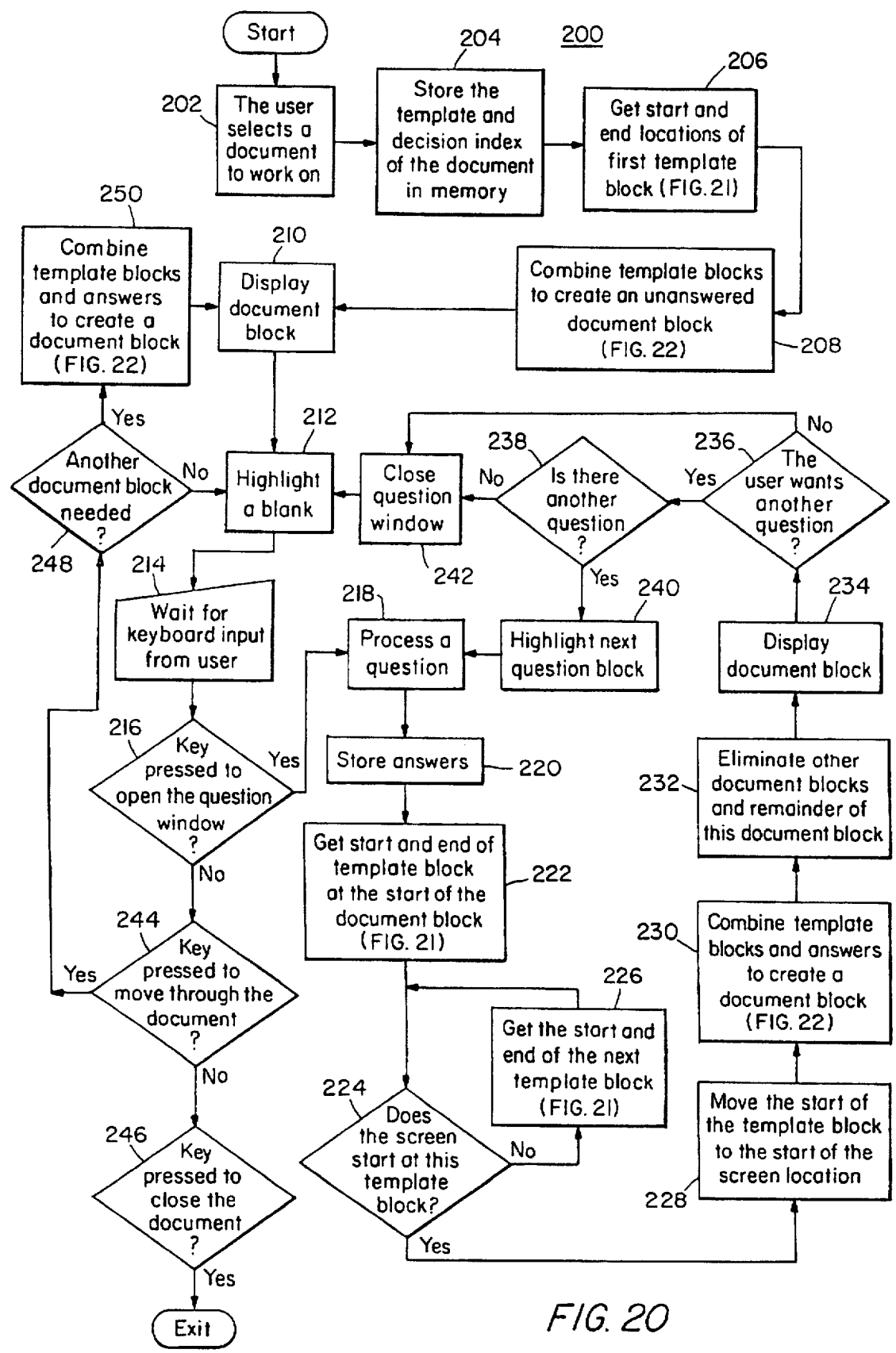
FIG. 20 is a flow chart of the document assembly system according to this invention.
Figure 21:
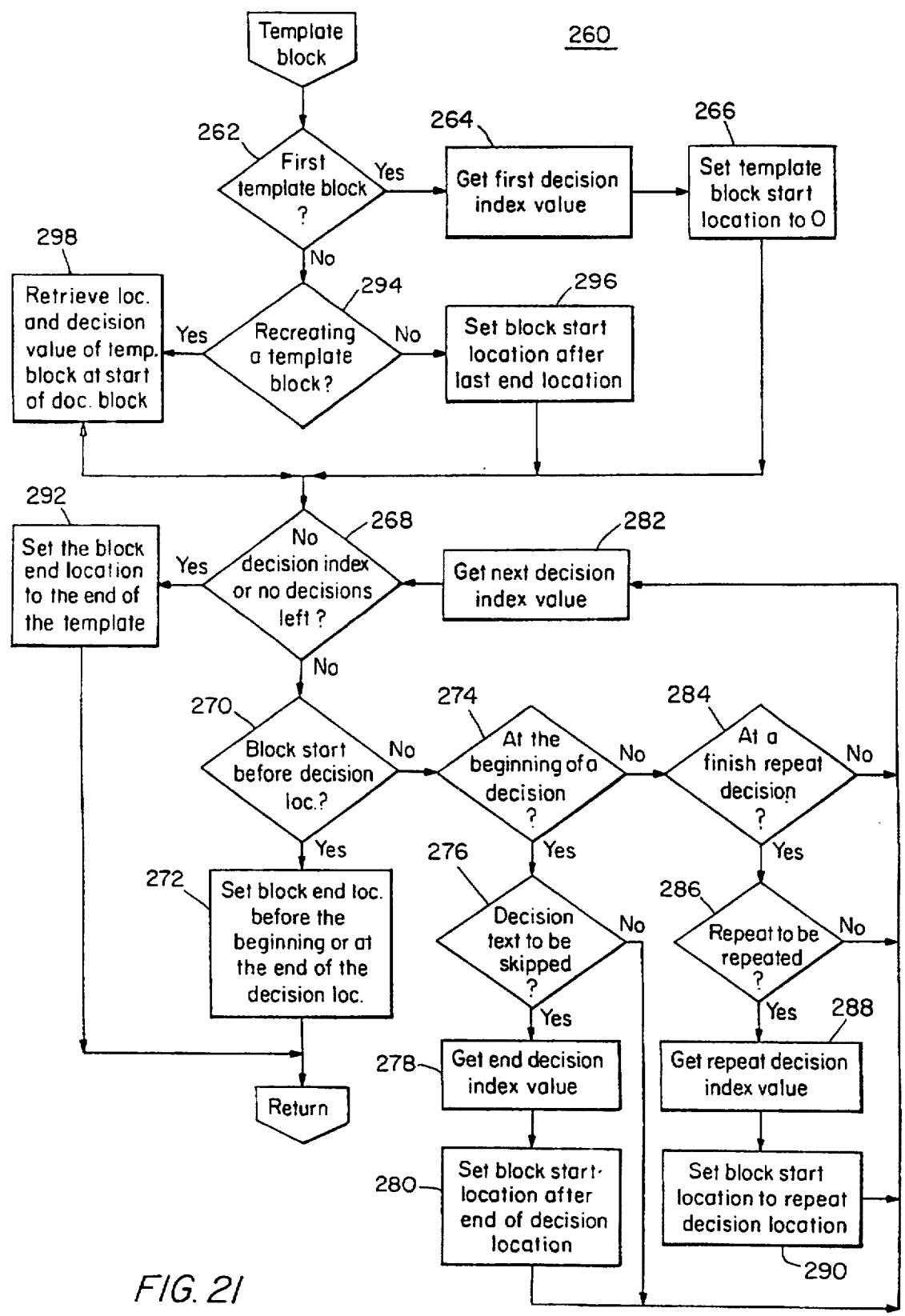
FIG. 21 is a more detailed flow chart of the routine for getting the start and end locations of template blocks in FIG. 20.
Figure 22:
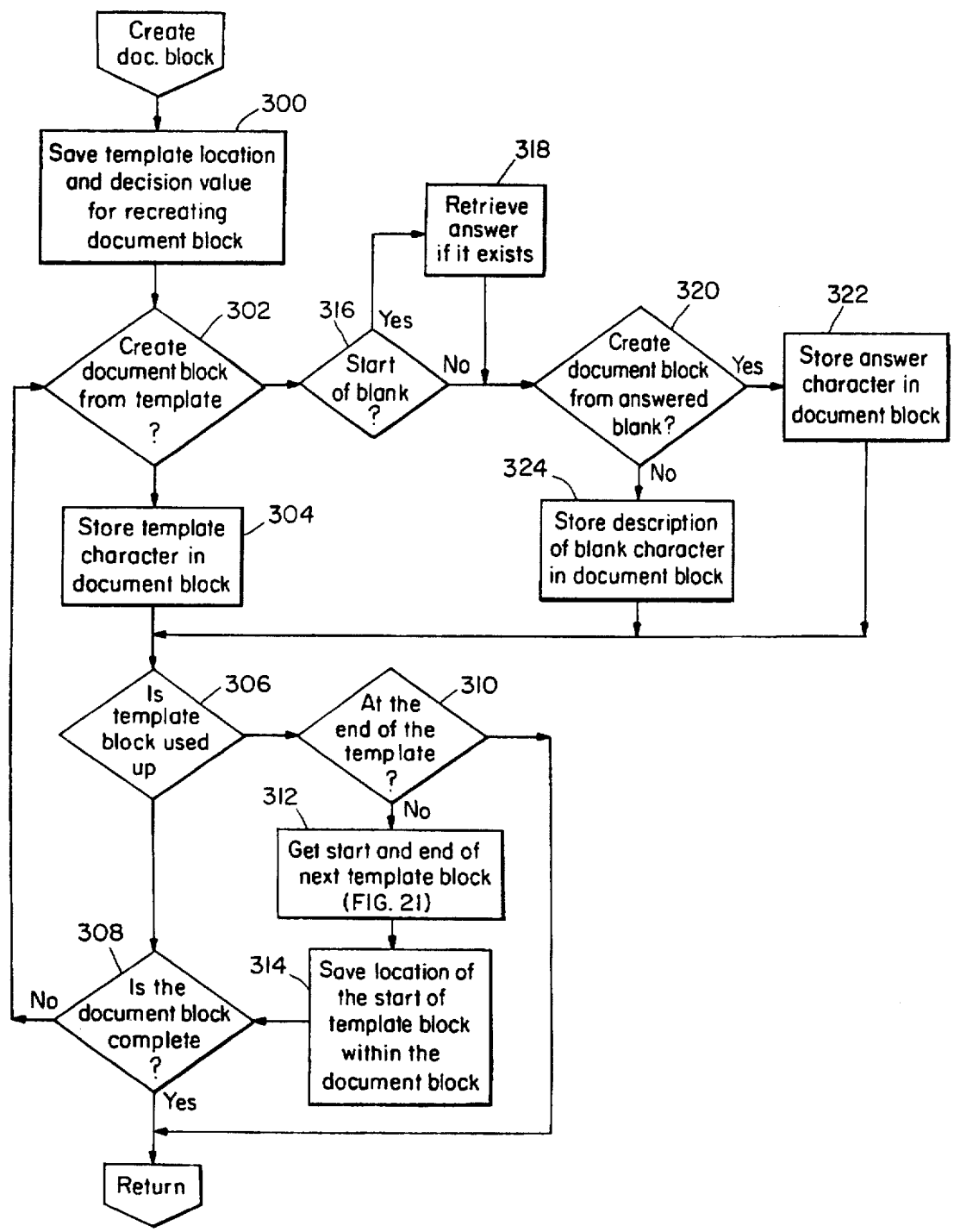
FIG. 22 is a more detailed flow chart of the routine for combining the template blocks with the answer index to form document blocks as shown in FIG. 20.

The use of the Decision Index to indicate the location of decisional options which are used to identify the sections of the template to be merged with previously stored answers and combined in sequence to contemporaneously recreate the document each time a new answer is supplied or each time that document portion is called to the screen, is accomplished by the software illustrated in the flow charts of FIGS. 20, 21 and 22.

The interactive document assembly 200, FIG. 20, starts with the user selecting a document to work on, step 202. For example, this can be the Special Power of Attorney. Next the template and the decision index of the document are stored in memory, step 204. Then the start and end locations of the first template block are obtained in step 206. This is done as indicated by the explanation with respect to FIG. 17. Then a portion of a template block, or a full template block, or a number of template blocks are combined to create, in step 208, the unanswered document block which is to appear on the screen The document block is displayed in step 210. The next question blank is highlighted in step 212 and the system waits for an input from the keyboard in step 214. If the key is pressed to open a question window in step 216, then a question is processed in step 218 and the answer is stored in step 220. Once the answer has been given, the template block at the start of the document block is obtained and indicated in step 222. This raises the question in step 224, "Does the screen start at this template block?"If the answer is no, the implication is that because answers have changed, template blocks may be inserted or eliminated so that successive template blocks must be obtained until the screen starts at the template block. Thus the system in that case gets the start and end of the next template block in step 226 and the system returns to step 224 until the template block obtained is the same as the template block to be displayed on the screen. If the screen does start at this template block, then the implication is that the exact screen location within the template block can be found and so the system moves from the start location of the template block to the screen location in step 228. This is so that the new document block will be created at the start screen location. Following this, the template blocks and the answers are combined in step 230 to create a document block. Also at this point, all other document blocks and the remainder of this document block not on the screen are eliminated in step 232, and the document block is displayed on the screen in step 234. If the user has requested another question in step 236, and the system has another question in step 238, the system then highlights the next question blank in step 240 and returns to step 218 to process that question. If there is no other question then the question box or question window is closed, step 242, and the system returns to step 212 and the blank is highlighted. If in step 236 the user did not want another question, the system goes directly to close the question box or question window in step 242.

If in step 216 no key is pressed to open the question window or box, the question is raised in step 244 as to whether a key has been pressed to simply move to another part of the document. If the answer is no, then the inquiry is made in step 246 as to whether the key has been pressed to close the document. If the response is yes, the system simply exits the routine. If a key has been pressed to move through the document, then the system inquires in step 248 as to whether another document block is needed. If one is not needed, the system returns to highlight a blank in step 212. If another document block is needed, then a portion of a template block, or one or more template blocks, are combined in step 250 with the necessary answers to create a document block and the system returns to step 210 to display the document block.

Getting the start and end locations of a template block as called for in steps 206, 222 and 226 is carried out as indicated by flow chart 260, FIG. 21. The inquiry is first made in step 262 as to whether this is the first template block. If it is, the system gets a first decision index value in step 264, in this case a repeat clause decisional option, to be used to determine the first template block, and then sets the start location to zero in step 266, since the first start template location is at point zero of the template. Following this, inquiry is made as to whether there is no decision index or no decisions left in step 268. What this means is that if there is no decision index or no decisions are left, the end of the template block becomes the end of the template. If the response is in the negative, that implies that the template block will be determined by the decision index value, and so in step 270 an inquiry is made as to whether the block starts before the decision location. What this means is that if the template start is before the decision location, the template block end will be set before the beginning of the decision index location or at the end of the decision location, and it implies that there may be a break in the text at the decision index location.

If the answer is yes, then the system sets the block end location before the beginning or at the end of the decision location as called for in step 272. The system then returns to the main routine in FIG. 20. If in step 270 the block does not start before the decision location, then inquiry is made in step 274 as to whether the system is at the beginning of a decision. The implication of that is that it must be determined whether or not the decisional text is to be included or excluded from the document. If it is, then the inquiry is made in step 276 as to whether the text should be skipped. If the answer is yes, then the system gets an end decision index value in step 278, which means that the text is skipped and the start location of the template block is after the skipped text, which is after the end decision location, and then in step 280 the block start location is set to a point after the end of the decision location and the system returns to get the next decision index value in step 282, so that the template block end location can be determined and then returns to step 268. If in step 276 the decision text is not to be skipped, the system simply loops around steps 278 and 280 and goes directly to get the next decision index value in step 282. In step 274, if the determination is made that the system is not at the beginning of a decision, then an inquiry is made in step 284 as to whether the system is at a finish of a repeat decision. If the answer is yes, the next inquiry made in step 286 is whether the repeat is to be repeated. If it is, the system is instructed in step 288 to get the repeat decision index value and then in step 290 to set the block start location to the repeat decision location. Following this the system returns to the next decision index value in step 282. If in step 268 there is no decision index or no decisions left, then the system moves to step 292 to set the block end location to the end of the template so that the end of the template block becomes the end of the template. If initially the system determined in step 262 that this was not the first template block, then inquiry is made in step 294 as to whether the system is recreating a template block. If it is not, then the system sets the block start location to a point after the last end location in step 296. If the system is recreating a template block, then in the step 298 the system retrieves the location and decision value of the template block at the start of the document block so that the template block at the start of the document block where answers have changed will be created.

The operation of combining the template blocks and answers or the template blocks and unanswered question blanks in steps 208, 250 and 230, is shown in greater detail in FIG. 22. The routine begins in step 300 by saving the template location and decision value for recreating the document block. Then the inquiry is made in step 302 as to whether a document block is being created from a template or from an answer. If it is being created from a template, then in step 304 the template character is stored in the document block and the inquiry is made in step 306 as to whether the template block is used up. If it is not, then the inquiry is made in step 308 as to whether the document block is complete. If it is not, the system returns to step 302 and if a document block is still being created from the template the next character from the template is stored in the document block in step 304. If it is indicated in step 306 that the template block is used up, then an inquiry is made in step 310 as to whether the system is at the end of the template. If it is, the system simply exits the routine. If it is not, the system in step 312 gets the start and the end of the next template block and then in step 314 saves the location of the start of the template block within the document block. What steps 310, 312 and 314 accomplish is to get the next template block and save the location of the template block within the document block so that the identity of the template block within the document block can be determined after answers have changed in the document block on the screen. After step 314 the system returns to step 308. If the response in step 308 is in the affirmative, the system simply exits the routine.

In step 302, if the document block is being created from an answered or unanswered blank, then inquiry is made in step 316 as to whether it is at the start of a blank. If it is the start of a blank, then in step 318 the answer is retrieved if it exists, and inquiry is made in step 320 as to whether the blank has been answered to create a document block from the answered blank. If it is, then in step 322 the answer character is stored in the document block and the system returns to step 306. If in step 320 the blank is unanswered, then in step 324 the system stores a description of a blank character in the document block and moves on to step 306. In step 316, if it is indicated that it is not the start of a blank, the system simply skips over the step of retrieving the answer, if it exists, in step 318, and goes directly to the inquiry in step 320 as to whether the document block is being created from the answered blank.

Although the system has been explained in the preferred embodiment as creating documents "top down" from the beginning to the end, it may as well perform "bottom up" from the end to the beginning And the documents can be created in final form without the asterisks or other markers.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. A document assembly system for use in assembling a document including at least a substantially textual portion comprising:

means for storing a model template formed of a sequence of sections and having decisional options including textual clause repeats and conditional clauses and questions to be answered for assembling a document;

means for indicating the location in said model template of said decisional options to identify the sequence of sections constituting said model template;

means for storing answers to questions posed in said template, each said question having a unique identifier; and means for merging and outputting with each section or part thereof, the answer corresponding to each section in said sequence and for contemporaneously assembling an at least partly textual document when answers are supplied for said preselected section;

means operable by a user to select a desired section and to change any answer appearing therein while displaying the desired section, and means for recreating the document text of a section in response to said change, as at least part of the document section is displayed or outputted, said recreating including, as required, re-executing any decisional options dependent upon the content of said answer.

2. The document assembly system of claim 1 in which said means for indicating the location of the decisional options includes means for representing the text offset of the beginning and end of each decisional option in the model template.

3. The document assembly system of claim 1 in which said means for storing answers includes an answer index having a unique identifier for each answer corresponding to its associated question.

4. The document assembly system of claim 3 in which said means for merging includes means for matching the identifier of each question with the corresponding answer identifier.

5. The document assembly system of claim 1 in which said means for merging and outputting includes means for detecting the location of the start of the next decision option in the template; means for tracking the present position in the template; and means, responsive to said present position being ahead of said start of the next decision option, for assembling into the document the template section up to the start of the next decision option.

6. The document assembly system of claim 1 in which said means for merging and outputting includes means, responsive to the present location being at or in a decision option, for determining whether the decision option is to be assembled into the document.

7. The document assembly system of claim 1 in which said means for merging and outputting includes means, responsive to the present location being at or past the end of a clause repeat, for deciding whether the clause represented by the clause repeat decisional option is to be repeated in the document.

8. The system of claim 1 wherein the means for assembling and the means for recreating the document text includes means for detecting the location of the start of the next decision option in the template; means for tracking the present position in the template; and means, responsive to said present position being ahead of said start of the next decision option, for assembling into the document the template section up to the start of the next decision option.

9. The system of claim 1 wherein the means for assembling and the means for recreating the document text includes means, responsive to the present location being at a decision option, for determining whether the decision option is to be assembled into the document.

10. The system of claim 1 wherein the means for assembling and the means for recreating the document text includes means, responsive to the present location being at the end of a clause repeat, for deciding whether the clause repeat decisional option is to be repeated in the document.

11. An interactive computerized document assembly system comprising:

means for storing a model template for a document including a sequence of question blanks to be replaced by information to form a complete document, and for storing a plurality of question blocks for said sequence of question blanks, instructions for manually entering information for said question blanks, and options for automatically inserting information for said question blanks;

means for displaying a portion of said template and for automatically highlighting in said displayed portion in sequence said question blanks to be replaced by information to form a complete document;

means, for each highlighted question blank, for automatically showing in conjunction with a portion of said displayed template portion, a said question block corresponding to the highlighted question blank;

means operable by a user to select a desired question block as shown on the display and to enter into said question block information to replace said highlighted question blank; and means for contemporaneously recreating a portion of the completed document after said information is entered, in dependence on said information and for recreating other portions of the completed document as they are displayed or outputted.

12. The system of claim 11 in which said means for contemporaneously recreating a portion of the completed document includes means for removing said question block after said information is entered and redisplaying said template portion with at least the highlighted question blank replaced by the entered information before highlighting another said question blank in the sequence.

13. The system of claim 12 in which said means for re-displaying includes means for matching the identifier of each question with the corresponding answer index identifier.

14. The system of claim 11 further including means for indicating the location in said template of said question blanks and for representing the text offset at the beginning and end of each said question blank for assuring information entered for a said question blank is correctly positioned within the template.

15. The system of claim 11 in which said means for displaying includes a video display device.

16. The system of claim 11 further including means for storing said entered information to replace a highlighted question blank including an answer index having a unique identifier for each piece of information corresponding to its associated question blank.

17. A document assembly system for use in assembling a document including at least a substantially textual portion, comprising:

a model template stored on computer storage means, said template formed of a sequence of sections and decisional options which include textual clause repeats and conditional clauses and questions to be answered for assembling a document;

means operable by a user to select, retrieve for display, and effect display, beginning from any location within the document chosen by the user, of a said section with a decisional option shown in said displayed section, for showing the user where the result of a decision will appear in the context of the document;

means for storing answers supplied by the user in response to display of the decisional option for said displayed section; and means for contemporaneously redisplaying in text form a said section as modified in accordance with the result of a decision executed after an answer was supplied, and for allowing the user to verify the correctness of the effect of the decision supplied in the context of each section of the document where the effect appears.

18. The document assembly system of claim 17 in which said means for contemporaneously redisplaying a said section along with an answer supplied includes:

means for marking the start and end locations of each displayed section, means for evaluating whether an answer has changed after an answered is supplied; and means, in response to said means for evaluating, for automatically retrieving the start of-the section containing the answer and redisplaying that section with the answer in place.

19. The system of claim 18 further including means for editing an answer supplied and for verifying the edited answer in place in the template section after an edited answer is supplied for immediately verifying the results of editing a previously supplied answer.

20. A method for operating a digital computer comprising a processor and memory to assemble a document including at least a substantially textual portion, comprising:

storing in the computer's memory a model template formed of a sequence of sections and having decisional options including textual clause repeats and conditional clauses and questions to be answered for assembling a document;

storing in the computer memory indicators of the location in said model template of said decisional options to identify the sequence of sections constituting said model template;

storing in the memory answers to questions posed in said template, each said question having a unique identifier;

operating the computer to merge and output, with each section or part thereof, the answers corresponding to each said preselected section and contemporaneously assembling an at least partly textual document when answers are supplied for said preselected section; and operating the computer to allow a user to view on a display and select a desired section of the document and to change any answer appearing therein, and in response to a said change recreating the document text of said section in response thereto, and including, as required, re-executing any decisional options depending upon the content of said answer, and recreating other portions of the completed document as they are displayed or outputted.

21. A method for operating a digital computer comprising a processor and memory to assemble a document including at least a substantially textual portion, comprising:

storing in said memory a model template, said template formed of a sequence of sections and decisional options which include textual, clause repeats and conditional clauses and questions to be answered for assembling a document;

operating the computer, while any section of the document is displayed, to retrieve and display a said section of the document with a decisional option shown in the displayed section for showing the user where the effect of the decision will appear in the context of the document;

receiving at least one answer supplied by a user in response to display of a decisional option:

storing in said memory answers supplied by a user in response to presentation to the user of a decisional option for said displayed section;

executing said decisional option responsive to the answer supplied; and contemporaneously redisplaying in text form a said section as modified in accordance with the result of executing said decisional option responsive to said answer, allowing the user to verify the correctness of the effect of the decision supplied in the context of each section of the document where the effect appears.

22. A method of operating a digital computer having a processor and memory to assemble a document including at least a substantially textual portion, comprising:

storing in the computer's memory a model template formed of a sequence of sections and having decisional options including textual clause repeats and conditional clauses and questions to be answered for assembling a document;

storing in the computer memory indicator of the location in said model template of said decisional options to identify the sequence of sections constituting said model template, storing in the memory answers to questions posed in said template, each said question having a unique identifier;

operating the computer to merge and output, with each section or part thereof, the answers corresponding to each said preselected section and also contemporaneously assembling an at least partly textual document when answers are supplied for said preselected section;

operating the computer to permit a user to view on a display, select and change any of said answers commencing from any place within the document; and in response to a said change, operating the computer to recreate the document text of the section containing said answer, and to display or output the recreated text consistent with said change.

* * * * *